(12) United States Patent
Imae

(10) Patent No.: US 11,782,162 B2
(45) Date of Patent: Oct. 10, 2023

(54) RANGE FINDING DEVICE, RANGE FINDING METHOD AND STORAGE MEDIUM

(71) Applicant: Ricoh Company, Ltd., Tokyo (JP)

(72) Inventor: Nozomi Imae, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 488 days.

(21) Appl. No.: 16/812,445

(22) Filed: Mar. 9, 2020

(65) Prior Publication Data

US 2020/0301017 A1    Sep. 24, 2020

(30) Foreign Application Priority Data

Mar. 18, 2019   (JP) .................................. 2019-050471

(51) Int. Cl.
| | | |
|---|---|---|
| *G01S 17/894* | (2020.01) | |
| *G01S 7/481* | (2006.01) | |
| *G01S 7/484* | (2006.01) | |
| *G01S 7/4863* | (2020.01) | |

(52) U.S. Cl.
CPC ............ *G01S 17/894* (2020.01); *G01S 7/484* (2013.01); *G01S 7/4815* (2013.01); *G01S 7/4816* (2013.01); *G01S 7/4863* (2013.01)

(58) Field of Classification Search
CPC .... G01S 17/894; G01S 7/4815; G01S 7/4816; G01S 7/484; G01S 7/4863; G01S 7/4865; G01S 17/10; G01S 17/87
See application file for complete search history.

(56) References Cited

U.S. PATENT DOCUMENTS

| | | | |
|---|---|---|---|
| 2010/0097643 A1 | 4/2010 | Imae | |
| 2011/0304589 A1* | 12/2011 | Yoshida | G06F 3/0428 |
| | | | 250/206.1 |
| 2016/0349369 A1 | 12/2016 | Lee et al. | |
| 2016/0349371 A1* | 12/2016 | Suzuki | G01S 11/12 |
| 2016/0370460 A1* | 12/2016 | Takahashi | G01S 17/931 |
| 2017/0019645 A1* | 1/2017 | Li | G02B 27/141 |

(Continued)

FOREIGN PATENT DOCUMENTS

| | | |
|---|---|---|
| EP | 3 101 382 A1 | 12/2016 |
| JP | 2014-055860 A | 3/2014 |

(Continued)

OTHER PUBLICATIONS

Communication pursuant to Article 94(3) EPC dated Jan. 4, 2022, in European Patent Application No. 20159422.3.

(Continued)

*Primary Examiner* — Jared Walker
(74) *Attorney, Agent, or Firm* — XSENSUS LLP

(57) ABSTRACT

A range finding device includes a plurality of light sources, each configured to emit irradiation light to an object; a plurality of light reception units configured to receive reflection light coming from the object when the irradiation light hits and reflects from the object, the number of plurality of light reception units being the same number of the plurality of light sources; and circuitry configured to shift light emission timing of at least one or more light sources among the plurality of light sources; and calculate a distance to the object based on information output from each of the plurality of light reception units.

20 Claims, 11 Drawing Sheets

(56) References Cited

U.S. PATENT DOCUMENTS

| | | | |
|---|---|---|---|
| 2017/0199271 A1* | 7/2017 | Nihei | H05B 47/115 |
| 2018/0128919 A1 | 5/2018 | Ichikawa et al. | |
| 2018/0267146 A1* | 9/2018 | Ingram | G01S 7/484 |
| 2019/0011539 A1* | 1/2019 | Matsui | G01S 7/4817 |
| 2019/0073781 A1* | 3/2019 | Izumi | G06T 7/521 |
| 2019/0195990 A1* | 6/2019 | Shand | G01S 7/4813 |
| 2019/0277971 A1 | 9/2019 | Lee et al. | |

FOREIGN PATENT DOCUMENTS

| | | |
|---|---|---|
| JP | 2016-008875 A | 1/2016 |
| JP | 2017-156306 | 9/2017 |
| JP | 2018-077143 | 5/2018 |
| WO | WO2011/094762 A2 | 8/2011 |
| WO | WO2017/038203 A1 | 3/2017 |
| WO | 2021/026518 A1 | 2/2021 |

OTHER PUBLICATIONS

Extended European Search Report dated Jul. 24, 2020 in European Patent Application No. 20159422.3, 8 pages
Office Action dated Dec. 6, 2022 in Japanese Patent Application No. 2019-050471, 6 pages.
Office Action dated May 16, 2023 in Japanese Patent Application No. 2019-050471, 5 pages.

\* cited by examiner

FIG. 14
LIGHT EMISSION TIMING AT A side 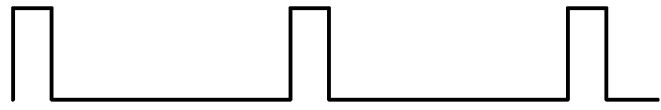
LIGHT EMISSION TIMING AT B side 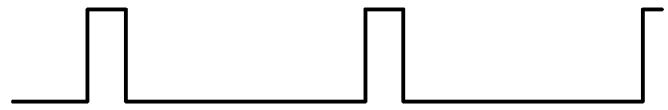
LIGHT EMISSION TIMING AT C side 
LIGHT EMISSION TIMING AT D side 
FIG. 15
LIGHT EMISSION TIMING AT A side 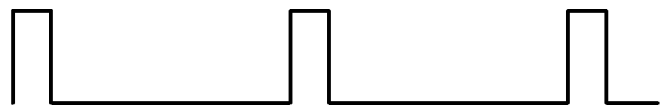
LIGHT EMISSION TIMING AT B side 
LIGHT EMISSION TIMING AT C side 
LIGHT EMISSION TIMING AT D side 

RANGE FINDING DEVICE, RANGE FINDING METHOD AND STORAGE MEDIUM

CROSS-REFERENCE TO RELATED APPLICATION

This application claims priority pursuant to 35 U.S.C. § 119(a) to Japanese Patent Application No. 2019-050471, filed on Mar. 18, 2019 in the Japan Patent Office, the disclosure of which is incorporated by reference herein in its entirety.

BACKGROUND

Technical Field

This disclosure relates to a range finding device, a range finding method, and storage medium.

Background Art

Conventionally, the time of flight (TOF) method can be used as one method of finding a range from an imaging device to an object, in which an irradiation or projection light is emitted to the object and a reflection light coming from the object is received, and then a range or distance to the object is calculated using a time difference between a time of emitting the irradiation or projection light and a time of receiving the reflection light. As to the TOF method, the irradiation or projection light having a given irradiation pattern is emitted to the object and then the reflection light coming from the object is received at an image sensor, and a time difference between the time of emitting the irradiation light and the time of receiving the reflection light detected by each pixel of the image sensor to calculate the range or distance to the object. The calculated range or distance value is set for each as bitmap data, and then stored as a distance image.

However, conventional range finders (TOF cameras) using the TOF system have no function to capture images of wider angle of view. As to the TOF camera, it is required that the irradiation light reaches the entire image capture range. If the irradiation range is set wider corresponding to the wider angle of view, the irradiation light diffuses and the amount of light per unit solid angle decreases, and thereby the measurable or detectable range of distance becomes shorter. As a countermeasure to this issue, the brightness of the light source can be increased, but this causes power consumption of the light source to increase, which is not preferable. Further, if a plurality of sets of the light emitting unit that emits the irradiation light and the sensor unit that receives the reflection light is used to capture an image of object at the same time, one set may receive the reflection light of the irradiation light emitted from another set, and thereby the range or distance cannot be accurately measured.

As to the range finding device, one conventional technology uses two light sources and two TOF systems for acquiring distance data used for projection mapping. Further, another conventional technology uses a plurality of light sources for acquiring distance data at a far-side positions.

However, some issues may occur in these conventional technologies, such as the accuracy of range finding or distance measurement deteriorates due to overlapping of the light emission timings of the two light sources, and further, when the light emission timings of the two light sources overlap, the peak power consumption increases, in which sufficient power may not be supplied by a battery drive or the like.

SUMMARY

In one aspect of the present invention, a range finding device is devised. The range finding device includes a plurality of light sources, each configured to emit irradiation light to an object; a plurality of light reception units configured to receive reflection light coming from the object when the irradiation light hits and reflects from the object, the number of plurality of light reception units being the same number of the plurality of light sources; and circuitry configured to shift light emission timing of at least one or more light sources among the plurality of light sources; and calculate a distance to the object based on information output from each of the plurality of light reception units.

In another aspect of the present invention, a method of finding a range to an object is devised. The method includes shifting light emission timing of at least one or more light sources among a plurality of light sources, each light source being configured to emit irradiation light to the object; receiving, using a plurality of light reception units, reflection light coming from the object when the irradiation light hits and reflects from the object, the number of plurality of light reception units being the same number of the plurality of light sources; and calculating a distance to the object based on information output from each of the plurality of light reception units.

In another aspect of the present invention, non-transitory computer readable storage medium storing one or more instructions that, when performed by one or more processors, cause the one or more processors to execute a method of finding a range to an object. The method includes shifting light emission timing of at least one or more light sources among a plurality of light sources, each light source being configured to emit irradiation light to the object; receiving, using a plurality of light reception units, reflection light coming from the object when the irradiation light hits and reflects from the object, the number of plurality of light reception units being the same number of the plurality of light sources; and calculating a distance to the object based on information output from each of the plurality of light reception units.

BRIEF DESCRIPTION OF THE DRAWINGS

A more complete appreciation of the description and many of the attendant advantages and features thereof can be readily acquired and understood from the following detailed description with reference to the accompanying drawings, wherein:

FIG. 14 illustrates an example of a timing chart of light emission timing when light emission timings of all of light sources included a range finding device according to modification example 3 of an embodiment are shifted; and FIG. 15 illustrates an example of a timing chart when light emission timings of some of a plurality of light sources of a range finding device according to modification example 3 of an embodiment set to the same timing.

The accompanying drawings are intended to depict embodiments of this disclosure and should not be interpreted to limit the scope thereof. The accompanying drawings are not to be considered as drawn to scale unless explicitly noted.

DETAILED DESCRIPTION

A description is now given of exemplary embodiments of this disclosures. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a range finding device and a range finding method according to an embodiment of the present invention with reference to the drawings. Also, the following embodiments are not limited to the present invention. Further, various omissions, substitutions, modifications, and combinations of components may be made within the scope of the following embodiments without departing from the scope of the present invention.

(Configuration of Range Finding Device)

Figure 1:
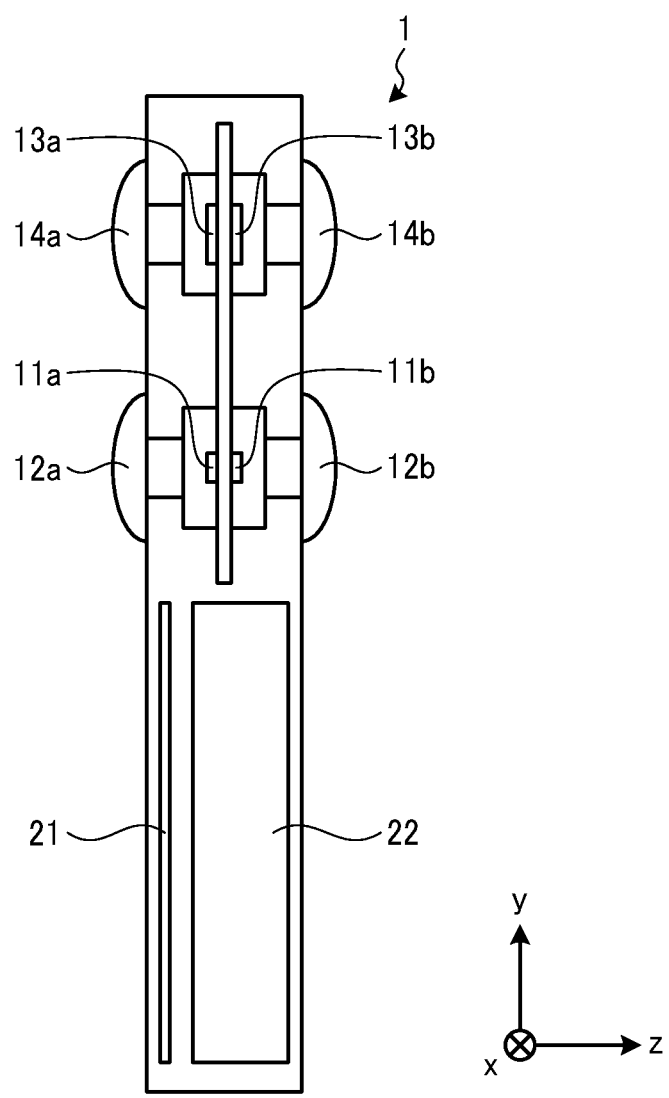
FIG. 1 illustrates an example of a configuration of a range finding device according to an embodiment of this disclosure.

FIG. 1 illustrates an example of a configuration of a range finding device 1 according to an embodiment. Hereinafter, a description is given of the configuration of the range finding device 1 with reference to FIG. 1.

As illustrated in FIG. 1, the range finding device 1 includes, for example, light sources 11a and 11b, light source optical systems 12a and 12b, time of flight (TOF) sensors 13a and 13b (light reception units), sensor optical systems 14a and 14b, a control unit 21, and a battery 22.

Each of the light sources 11a and 11b is a light-emitting device, such as a laser diode, vertical cavity surface emitting laser (VCSEL), and light emitting diode (LED).

The light source optical system 12a is an optical system used for projecting the light (hereinafter, irradiation light or projection light) emitted from the light source 11a with a given angle of view using a lens or the like.

The light source optical system 12b is an optical system used for projecting the light (hereinafter, irradiation light or projection light) emitted from the light source 11b with a given angle of view using a lens or the like.

The TOF sensor 13a is a light receiving sensor that measures the time difference between a time of emitting the irradiation light from the light source 11a via the light source optical system 12a and a time of receiving the reflection light coming from an object when the irradiation light hits and reflects from the object.

The TOF sensor 13b is a light receiving sensor that measures the time difference between a time of emitting the irradiation light from the light source 11b via the light source optical system 12b and a time of receiving the reflection light coming from an object when the irradiation light hits and reflects from the object.

Thus, the distance to the object can be calculated based on the time difference between the time of emitting the irradiation light and the time of receiving the reflection light, and the light speed.

The TOF sensors 13a and 13b have a given structure, in which sensor elements are arranged in a two-dimensional array. The TOF sensors 13a and 13b are not limited to the light receiving sensors that measure the time difference between the time of emitting the irradiation light and the time of receiving the reflection light. For example, each of the TOF sensors 13a and 13b can be an image sensor using a solid-state image sensor, such as charge-coupled device (CCD) or complementary metal oxide semiconductor (CMOS).

The sensor optical system 14a is an optical system that uses lens or the like to guide, to the TOF sensor 13a, the reflection light reflecting from the object when the irradiation light is emitted from the light source 11a and the light source optical system 12a toward the object and then reflected from the object.

The sensor optical system 14b is an optical system that uses lens or the like to guide, to the TOF sensor 13b, the reflection light reflecting from the object when the irradiation light is emitted from the light source 11b and the light source optical system 12b toward the object and then reflected from the object.

The control unit 21 includes a control board circuit that controls the light reception time by the TOF sensors 13a and 13b and the image capturing timing (light reception timing) by the TOF sensors 13a and 13b.

The battery 22 supplies power to the light sources 11a and 11b to emit the light. The battery 22 also supplies power used for the processing performed by the TOF sensors 13a and 13b, and the control unit 21. In the configuration illustrated in FIG. 1, the battery 22 is provided as a mobile battery, but is not limited thereto. For example, the battery 22 can be an external power supply battery, or can be a combination of the mobile battery and the external power supply battery.

FIG. 1 illustrates one example configuration having two sets of the light source and the TOF sensor, such as the two light sources 11a and 11b and the two TOF sensors 13a and 13b, but is not limited thereto. For example, three or more sets of the light source and the TOF sensor can be used.

(Angle of View of Range Finding Device)

Figure 2:
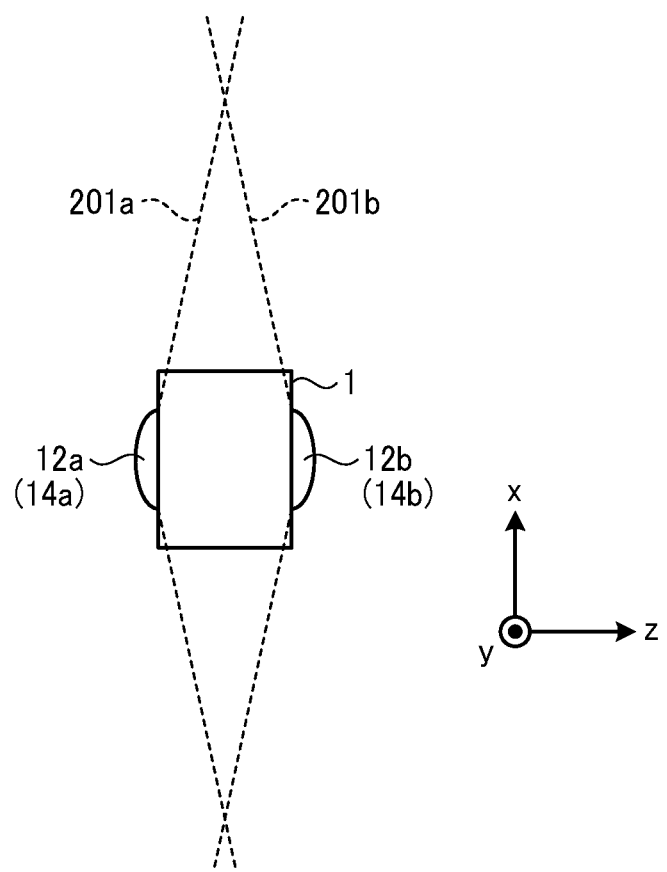
FIG. 2 illustrates an angle of view of a range finding device according to an embodiment of this disclosure.

FIG. 2 illustrates an angle of view of the range finding device 1. Hereinafter, a description is given of the angle of view of the range finding device 1 with reference FIG. 2.

As illustrated in FIGS. 1 and 2, the range finding device 1 employs a configuration disposing the light source 11a, the light source optical system 12a, the TOF sensor 13a and the sensor optical system 14a at one side, and disposing the light source 11b, the light source optical system 12b, and the sensor optical system 14b at the opposite side to enable to acquire range or distance information of full-view spherical range.

For example, the irradiation light emitted from the light source 11a and the light source optical system 12a has an angle of view 201a of 180 degrees or more as illustrated in FIG. 2. Similarly, the irradiation light emitted from the light source 11b and the light source optical system 12b has an angle of view 201b having an angle of view 201b of 180 degrees or more as illustrated in FIG. 2. With this configuration, the range finding device 1 can acquire the range or distance information of full-view spherical range.

Since the angle of view of the irradiation light emitted from each of the light source optical systems 12a and 12b is set to 180 degrees or more, the angle of view of the irradiation light emitted from the light source optical system 12a and the angle of view of the irradiation light emitted from the light source optical system 12b partially overlap with each other as illustrated in FIG. 2.

The sensor optical system 14a guides the reflection light, reflected from the object when the irradiation light emitted with the angle of view 201a hits the object, to the TOF sensor 13a so that the reflection light is focused on the TOF sensor 13a with the same angle of view.

Similarly, the sensor optical system 14b guides the reflection light, reflected from the object when the irradiation light emitted with the angle of view 201b hits the object, to the TOF sensor 13b so that the reflection light is focused on the TOF sensor 13b with the same angle of view of the irradiation light.

(Hardware Configuration of Range Finding Device)

Figure 3:
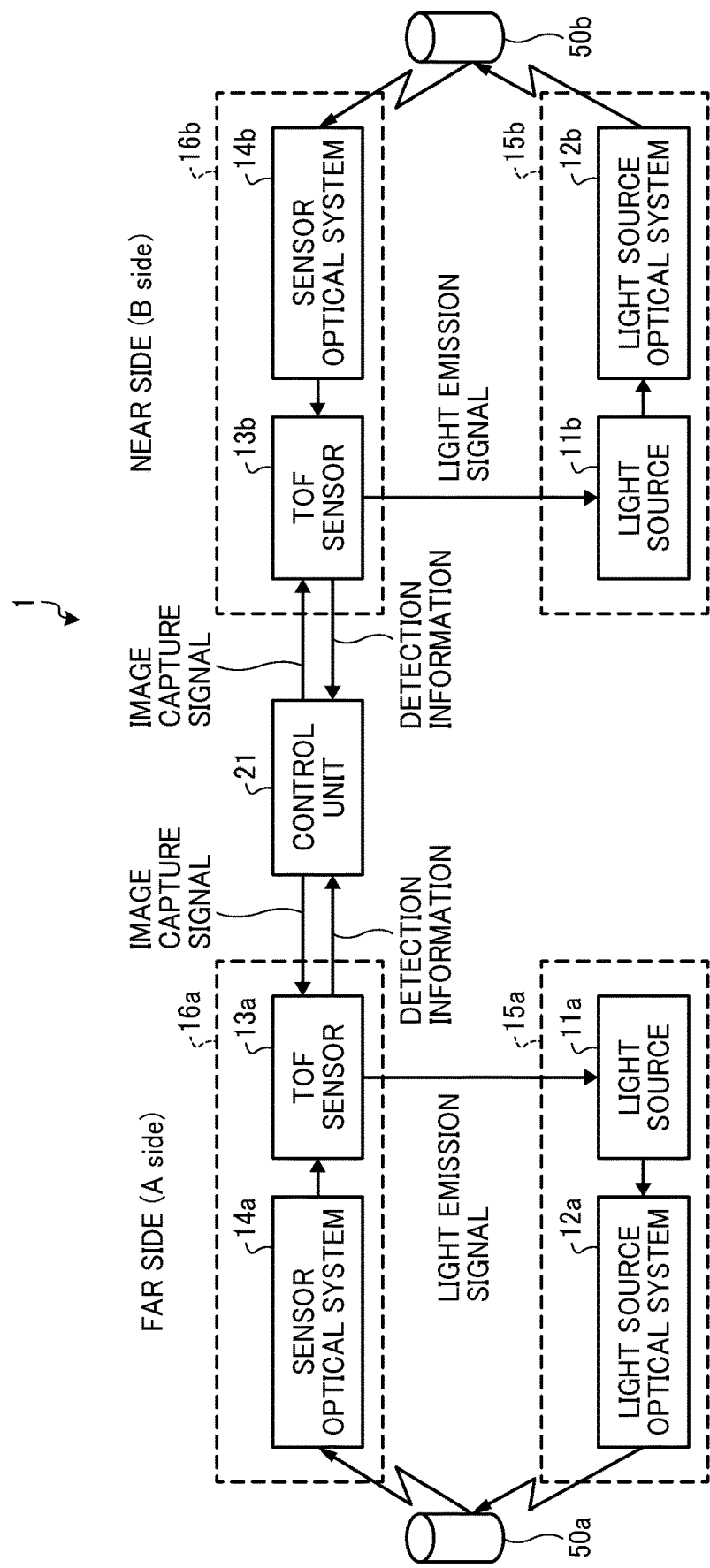
FIG. 3 illustrates an example of a hardware block diagram of a range finding device according to an embodiment of this disclosure.

FIG. 3 illustrates an example of a hardware block diagram of the range finding device 1 according to the embodiment. Hereinafter, a description is given of the hardware configuration of the range finding device 1 with reference FIG. 3.

As illustrated in FIG. 3, the range finding device 1 includes, for example, a light emission unit 15a including a light source 11a and a light source optical system 12a, a light emission unit 15b including a light source 11b and a light source optical system 12b, a light reception unit 16a including a TOF sensor 13a and a sensor optical system 14a, a light reception unit 16b including a TOF sensor 13b and a sensor optical system 14b, and a control unit 21.

The control unit 21 transmits image capture signals (operation signals), each is shifted in timing, to the TOF sensors 13a and 13b, to be described later. When the TOF sensors 13a and 13b respectively receives the image capture signals from the control unit 21, the TOF sensors 13a and 13b respectively transmit the light emission signals (light emission patterns) to the light sources 11a and 11b, respectively, to control the light emitting operations of the light sources 11a and 11b, respectively.

Then, the light sources 11a and 11b respectively emit the light in accordance with the light emission signals received from the TOF sensors 13a and 13b, and project the light as the irradiation light through the light source optical systems 12a and 12b, respectively.

In an example case of FIG. 3, the irradiation light emitted from the light source optical system 12a hits and reflects from an object 50a disposed at a far side ("A side"), and the TOF sensor 13a receives the reflection light via the sensor optical system 14a.

Further, the irradiation light emitted from the light source optical system 12b hits and reflects from an object 50b disposed at a near side ("B side"), and the TOF sensor 13b receives the reflection light via the sensor optical system 14b.

The TOF sensors 13a and 13b receive the reflection light, and output the detection information including information about the time difference between the time of emitting the irradiation light and the time of receiving the reflection light detected by each sensor element, to the control unit 21. Then, based on the detection information received from the TOF sensors 13a and 13b, the control unit 21 calculates a distance image by converting the time information into a distance value for each pixel. The measurement operation of distance can use typical phase detection method of the TOF camera, and can use the operation described in JP-2018-077143-A.

(Functional Configuration of Range Finding Device)

Figure 4:
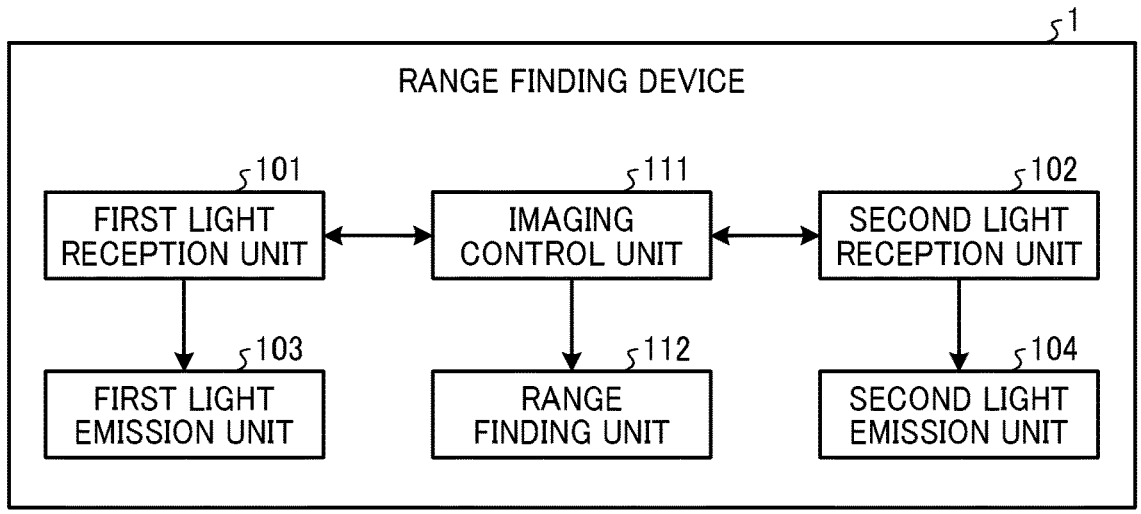
FIG. 4 illustrates an example of a functional block diagram of a range finding device according to an embodiment of this disclosure.

FIG. 4 illustrates an example of a functional block diagram of the range finding device 1. Hereinafter, a description is given of the functional configuration of the range finding device 1 with reference FIG. 4.

As illustrated in FIG. 4, the range finding device 1 includes, for example, a first light reception unit 101 (light reception unit), a second light reception unit 102 (light reception unit), a first light emission unit 103, a second light emission unit 104, an imaging control unit 111 (operation control unit), and a range finding unit 112 (measurement unit).

The first light reception unit 101 is a functional unit that receives the reflection light reflected from the object when the irradiation light emitted from the first light emission unit 103 hits and reflects from the object, in accordance with the image capture signal received from the imaging control unit 111.

Further, when the first light reception unit 101 receives the image capture signal from the imaging control unit 111, the first light reception unit 101 outputs the light emission signal to the first light emission unit 103 to control the light emitting operation.

Further, when the first light reception unit 101 receives the reflection light, the first light reception unit 101 outputs the detection information including the information about the time difference between the time of emitting the irradiation light and the time of receiving the reflection light. The first light reception unit 101 can be implemented by the light reception unit 16a, the TOF sensor 13a and the sensor optical system 14a illustrated in FIG. 3.

The second light reception unit 102 is a functional unit that receives the reflection light reflected from the object when the irradiation light emitted from the second light emission unit 104 hits and reflects from the object, in accordance with the image capture signal received from the imaging control unit 111.

Further, when the second light reception unit 102 receives the image capture signal from the imaging control unit 111, the second light reception unit 102 outputs the light emission signal to the second light emission unit 104 to control the light emitting operation.

Further, when the second light reception unit 102 receives the reflection light, the second light reception unit 102 outputs the detection information including the information about the time difference between the time of emitting the irradiation light and the time of receiving the reflection light. The second light reception unit 102 can be implemented by the light reception unit 16b, the TOF sensor 13b and the sensor optical system 14b illustrated in FIG. 3.

The first light emission unit 103 is a functional unit that emits the light emitted from the light source 11a to the outside in accordance with the light emission signal received from the first light reception unit 101. The first light emission unit 103 can be implemented by the light emission unit 15a, that is the light source 11a and the light source optical system 12a illustrated in FIG. 3.

The second light emission unit 104 is a functional unit that emits the light emitted from the light source 11b to the outside in accordance with the light emission signal received from the second light reception unit 102. The second light emission unit 104 can be implemented by the light emission unit 15b, that is the light source 11b and the light source optical system 12b illustrated in FIG. 3.

The imaging control unit 111 is a functional unit that controls the operation of the first light reception unit 101 and the second light reception unit 102. Specifically, the imaging control unit 111 transmits one image capture signal (operation signal) to the first light reception unit 101 and another image capture signal (operation signal) to the second light reception unit 102 by shifting the timing of one image capture signal and the timing of another image capture signal so that the imaging operation using the first light reception unit 101 and the imaging operation using the second light reception unit 102 are shifted (i.e., light receiving operation, light emitting operation by the first light emission unit 103 and the second light emission unit 104). That is, the light emitting operation of the first light emission unit 103 and the light emitting operation of the second light emission unit 104 is controlled using the image capture signals output by the imaging control unit 111.

Further, the imaging control unit 111 receives the detection information from the first light reception unit 101 and the second light reception unit 102, respectively. The imaging control unit 111 can be implemented by the control unit 21 illustrated in FIG. 3.

The range finding unit 112 is a functional unit that generates a distance image by converting the time information into a distance value for each pixel based on the detection information that the imaging control unit 111 has received from the first light reception unit 101 and the second light reception unit 102. The range finding unit 112 can be implemented by the control unit 21 illustrated in FIG. 3.

Since FIG. 4 conceptually illustrates the first light reception unit 101, the second light reception unit 102, the first light emission unit 103, the second light emission unit 104, the imaging control unit 111, and the range finding unit 112, the configuration is not limited thereto. That is, a plurality of functional units illustrated as separate functional units in the range finding device 1 of FIG. 4 can be implemented as one functional unit. For example, the imaging control unit 111 and the range finding unit 112 are separate units in FIG. 4, but can be implemented as one unit. On the other hand, the function of one functional unit in the range finding device 1 of FIG. 4 can be divided into a plurality of functions, and a plurality of functional units can be configured.

Further, the first light reception unit 101 and the second light reception unit 102 are configured to output the detection information including the information about the time difference between the time of emitting the irradiation light and the time of receiving the reflection light, but is not limited thereto. That is, the first light reception unit 101 and the second light reception unit 102 can be configured to calculate the distance based on the information about the time difference between the time of emitting the irradiation light and the time of receiving the reflection light, and directly output the distance information as the detection information.

(Light Emission Timing of Light Emission Unit and Light Reception Timing of Light Reception Unit)

Figure 5:
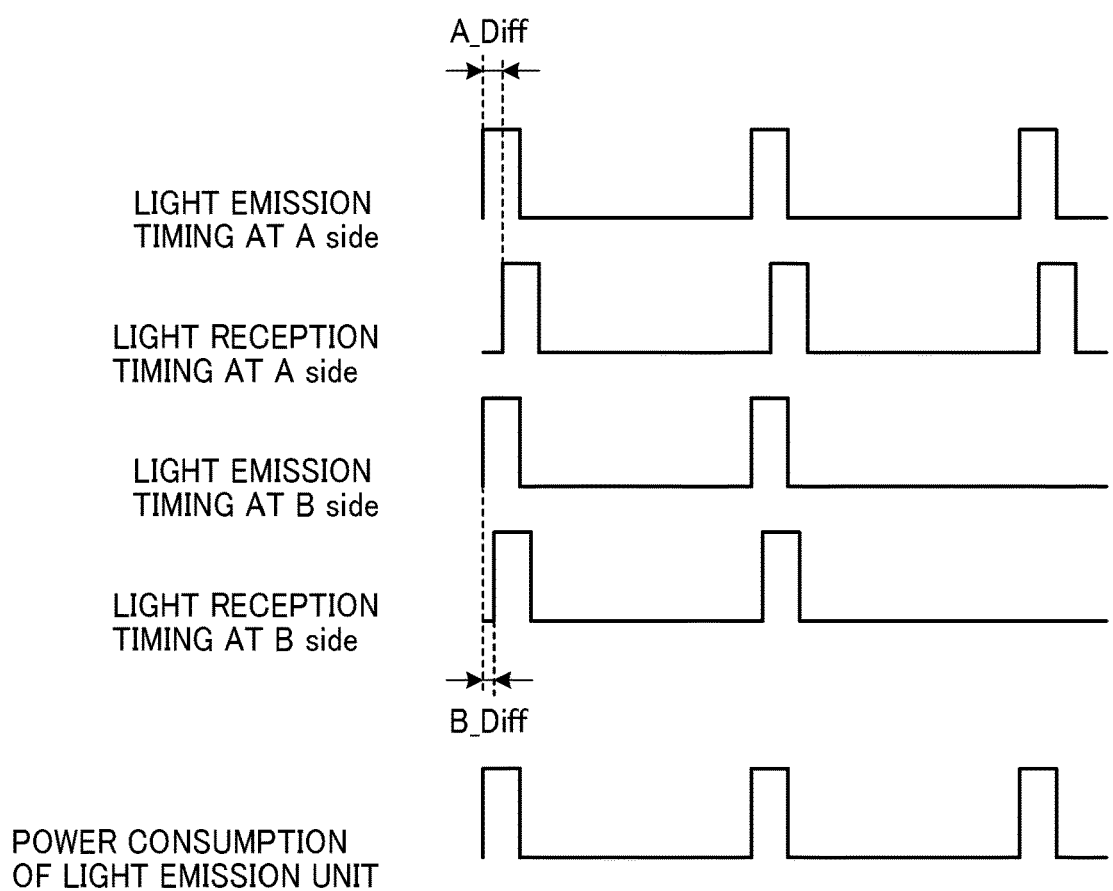
FIG. 5 illustrates an example of a timing chart of light emission timing and light reception timing when light emission timings from two light sources of a range finding device are set to the same timing.

FIG. 5 illustrates an example of a timing chart of light emission timing and light reception timing when the light emission timing from two light sources of the range finding device 1 are set to the same timing. Hereinafter, a description is given of an operation when the light emission timings of the two light sources 11a and 11b are set to the same timing with reference to FIG. 5.

As above described with reference to FIG. 3, there is a case that the object 50a is disposed at the far side (A side) and the irradiation light is emitted from the first light emission unit 103 while the object 50b is disposed at the near side (B side) and the irradiation light is emitted from the second light emission unit 104.

The irradiation light emitted to the A side, that is, the irradiation light emitted from the first light emission unit 103 hits and reflects from the object 50a, and then the reflection light is received by the first light reception unit 101.

At this time, the time difference of "A_Diff," which is the difference between the timing when the irradiation light is emitted to the A side (A-side light emission timing) and the timing when the reflection light is received at the A side (A-side light reception timing) can be used to calculate a time required for traveling between the range finding device 1 and the object 50a, and then the distance between the range finding device 1 and the object 50a can be calculated based on the calculated time.

Further, the irradiation light irradiation light emitted to the B side, that is, the irradiation light emitted from the second light emission unit 104 hits and then reflects from the object 50b, and then the reflection light is received by the second light reception unit 102.

At this time, the time difference of "B_Diff," which is the difference between the timing when the irradiation light is emitted to the B side (B-side light emission timing) and the timing when the reflection light is received at the B side (B-side light reception timing) can be used to calculate a time required for traveling between the range finding device 1 and the object 50b, and then the distance between the range finding device 1 and the object 50b can be calculated based on the calculated time.

In this case, since the distance from the range finding device 1 to the object 50a is longer than the distance from the range finding device 1 to the object 50b, as illustrated in FIG. 5, the time difference of "A_Diff" becomes longer than the time difference of "B_Diff."

In an example of FIG. 5, since the A-side light emission timing and the B-side light emission timing are set to the same timing, as indicated by the waveform of power consumption in the lower part of FIG. 5, the first light emission unit 103 and the second light emission unit 104 simultaneously emit the light, so that the peak power consumption increases with the effect of simultaneous emission of the light.

When the peak power consumption becomes greater, the battery 22 cannot supply sufficient power if the battery 22 is a mobile battery that stores relatively smaller electricity charges, and the light quantity of the irradiation light emitted from the first light emission unit 103 and the second light emission unit 104 becomes smaller, and the measurable distance becomes shorter.

Further, as to the range finding device 1 for capturing the full-view spherical range illustrated in FIG. 1, the projection or irradiation range of the first light emission unit 103 (the range of the angle of view 201a illustrated in FIG. 2) and the projection or irradiation range of the second light emission unit 104 (the range of the angle of view 201b illustrated in FIG. 2) are mostly different ranges, but the projection or irradiation ranges are partially overlapped as illustrated in FIG. 2.

Therefore, when the A-side light emission timing and the B-side light emission timing are the same timing, each of the first light reception unit 101 and the second light reception unit 102 cannot determine whether the reflection light corresponds to the irradiation light emitted from the first light emission unit 103 or the irradiation light emitted from the second light emission unit 104, so that the range finding cannot be performed accurately, and thereby the range finding precision may decrease.

Figure 6:
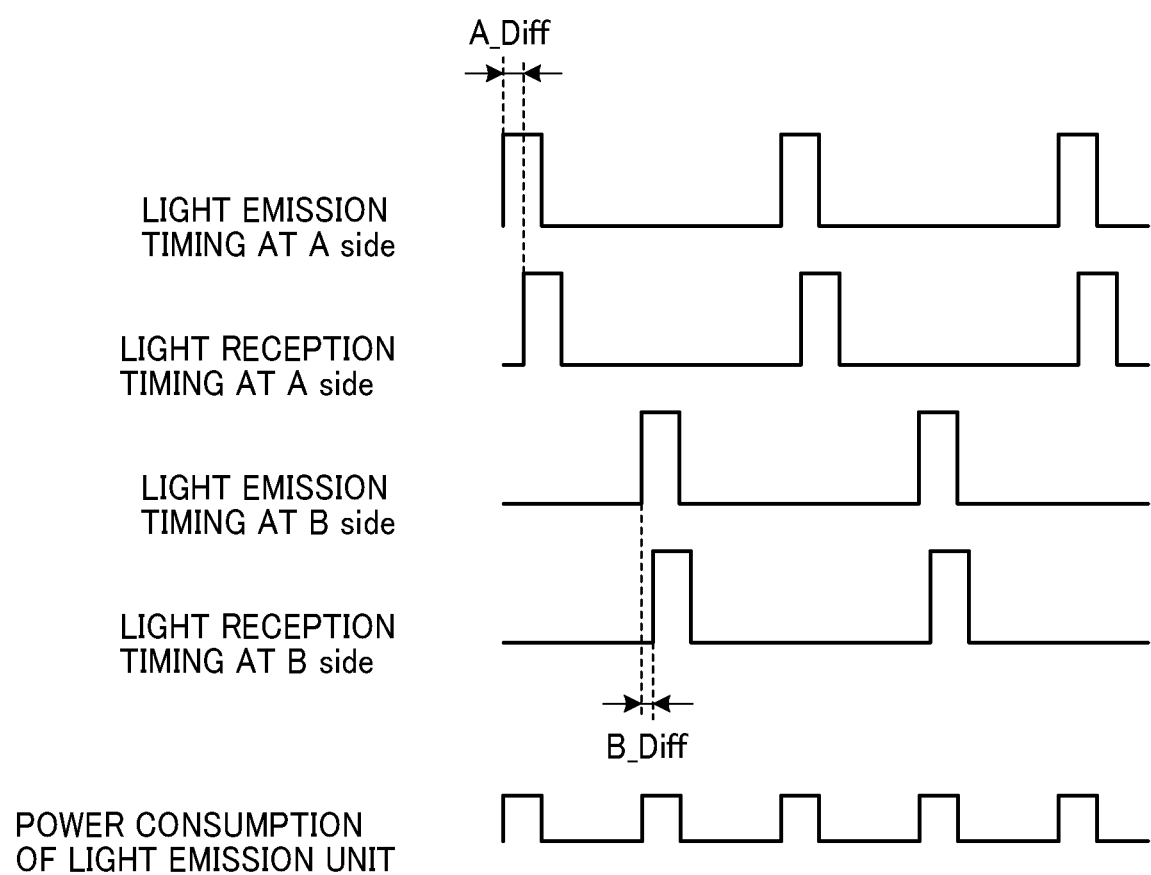
FIG. 6 illustrates an example of a timing chart of light emission timing and light reception timing when light emission timings from the two light sources of a range finding device are shifted.

FIG. 6 illustrates an example of a timing chart of light emission timing and light reception timing when the light emission timings from two light sources of the range finding device 1 are shifted. Hereinafter, a description is given of an operation when the light emission timings of the two light sources 11a and 11b are shifted with reference FIG. 6.

As to the range finding device 1, as illustrated in FIG. 6, the irradiation light is emitted to the A side at one timing (A-side light emission timing) by the first light emission unit 103 and the irradiation light is emitted to the B side at another timing (B-side light emission timing) by the second light emission unit 104 without overlapping the A-side light emission timing and the B-side light emission timing.

As a result, as illustrated in the waveform of power consumption in the lower part of FIG. 6, the peak of power consumption waveform occurs at different timings for the first light emission unit 103 and the second light emission unit 104 because the first light emission unit 103 and the second light emission unit 104 independently emit the light at the different timing, so that the peak of the power consumption waveform illustrated in FIG. 6 can become smaller than the peak of power consumption waveform illustrated in FIG. 5.

That is, the total power consumption of the operation performed by setting the light emission timing of the first light emission unit 103 and the light emission timing of the second light emission unit 104 at the same timing (see FIG. 5) and the total power consumption of the operation performed by setting the light emission timing of the first light emission unit 103 and the light emission timing of the second light emission unit 104 at the different timings (FIG. 6) may become the same value. However, in a case of FIG. 6, the battery 22 can supply sufficient power even if the battery 22 is a mobile battery, and the light quantity of the irradiation light emitted from the first light emission unit 103 and the light quantity of the irradiation light emitted from the second light emission unit 104 become given sufficient levels, and the measurable or detectable distance can be set longer.

Further, when the A light emission timing and the B side light emission timing are shifted, each of the first light reception unit 101 and the second light reception unit 102 can correctly determine whether the reflection light corresponds to the irradiation light emitted from the first light emission unit 103 or the irradiation light emitted from the second light emission unit 104, so that the range finding can be performed accurately, and thereby the range finding precision can be enhanced.

(Flow of Overall Operation of Range Finding Device)

Figure 7:
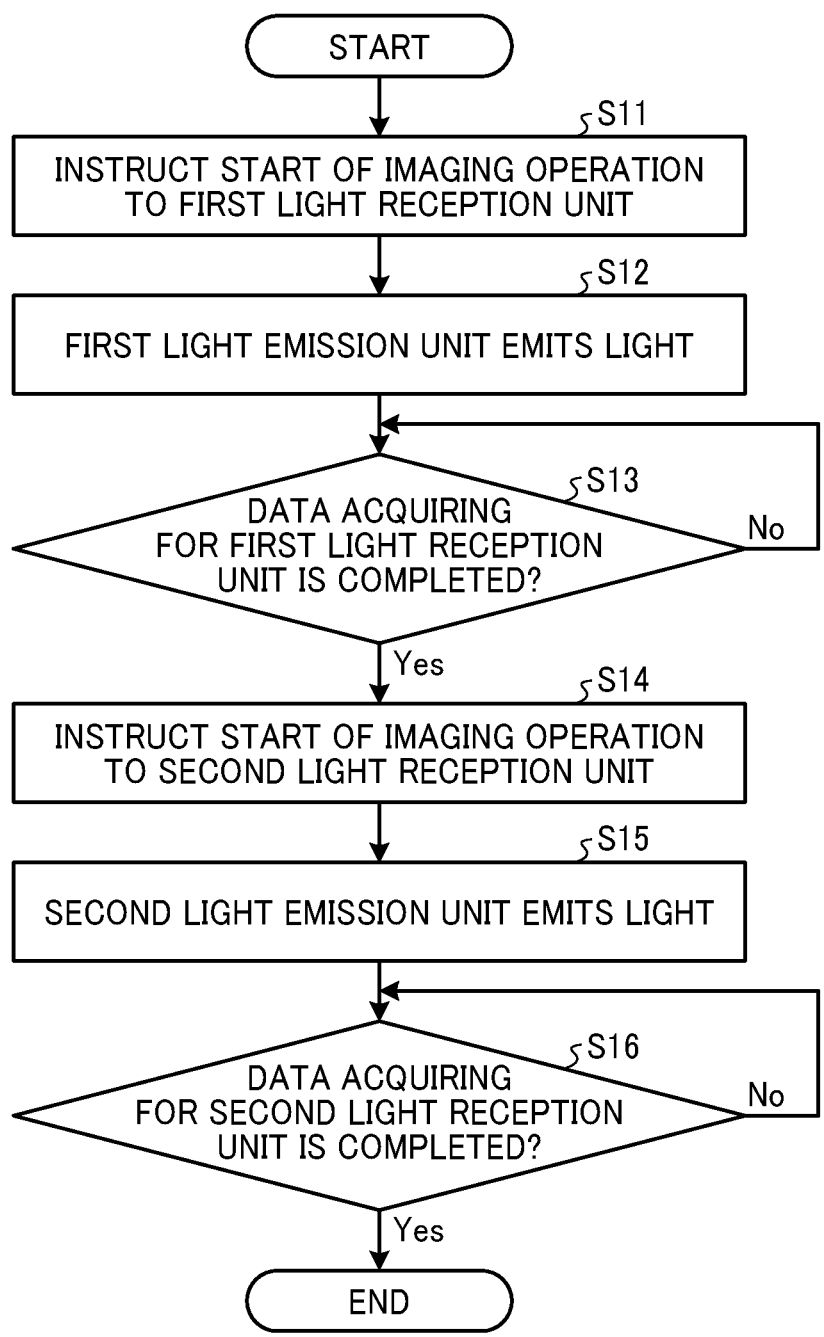
FIG. 7 is a flowchart illustrating an example of a flow of operation of a range finding device according to the embodiment.

FIG. 7 is a flowchart illustrating an example of a flow of operation of the range finding device 1 according to the embodiment. Hereinafter, a description is given of a flow of operation of the range finding device 1 with reference FIG. 7.

Steps S11 and S12: The imaging control unit 111 transmits the image capture signal to the first light reception unit 101 to instruct a start of the imaging operation by the first light reception unit 101. When the first light reception unit 101 receives the image capture signal, the first light reception unit 101 outputs the light emission signal to the first light emission unit 103 to start to emit the irradiation light. Then, the sequence proceeds to step S13.

Step S13: When the first light reception unit 101 receives the reflection light with respect to the irradiation light emitted from the first light emission unit 103, the first light reception unit 101 outputs detection information including information about the time difference between the time of emitting the irradiation light and the time of receiving the reflection light. Then, the imaging control unit 111 receives the detection information from the first light reception unit 101 (acquiring data), and then transmits the detected information to the range finding unit 112. Then, based on the detection information that the imaging control unit 111 has received from the first light reception unit 101, the range finding unit 112 calculates a distance image by converting the time information into a distance value for each pixel.

When the range finding unit 112 completes the calculation of distance image for the first light reception unit 101 (step S13: Yes), the sequence proceeds to step S14. If the range finding unit 112 does not yet complete the calculation of distance image for the first light reception unit 101 (step S13: No), step S13 is repeated. The timing of calculation of distance image by the range finding unit 112 is not limited thereto. For example, the calculation of distance image by the range finding unit 112 can be performed after completing a series of processing illustrated in FIG. 7.

Step S14 and S15: The imaging control unit 111 transmits the image capture signal to the second light reception unit 102 to instruct a start of the imaging operation by the second light reception unit 102. When the second light reception unit 102 receives the image capture signal, the second light reception unit 102 outputs the light emission signal to the second light emission unit 104 to start to emit the irradiation light. Then, the sequence proceeds to step S16.

Step S16: When the second light reception unit 102 receives the reflection light with respect to the irradiation light emitted from the second light emission unit 104, the second light reception unit 102 outputs detection information including information about the time difference between the time of emitting the irradiation light and the time of receiving the reflection light. Then, the imaging control unit 111 receives the detection information from the second light reception unit 102 (acquiring data), and then transmits the detection information to the range finding unit 112. Then, based on the detection information that the imaging control unit 111 has received from the second light reception unit 102, the range finding unit 112 calculates a distance image by converting the time information into a distance value for each pixel.

When the range finding unit 112 completes the calculation of distance image for the second light reception unit 102 (step S16: Yes), the sequence is terminated. If the range finding unit 112 does not yet complete the calculation of distance image for the second light reception unit 102 (step S16: No), step S16 is repeated.

The range finding device 1 performs the sequence of steps S11 to S16 to execute the entire operation.

In an example case in FIG. 7, the imaging operation by the first light reception unit 101 and the imaging operation by the second light reception unit 102 are terminated by performing one imaging operation, but is not limited thereto. For example, the sequence of imaging operation of FIG. 7 can be repeated for a given number of times. If the imaging operation is repeated for a given number of times, for example, the average of distance values of each pixel indicated by the distance images derived by the range finding unit 112 can be obtained.

As described above, the range finding device 1 shifts the timing of the irradiation (light emission) by the first light emission unit 103 and the timing of the irradiation (light emission) by the second light emission unit 104 so that the timing of the irradiation (light emission) by the first light emission unit 103 and the timing of the irradiation (light emission) by the second light emission unit 104 do not overlap with each other.

Thus, as illustrated in the waveform of power consumption in the lower part of FIG. 6, the peak of power consumption waveform becomes different in each of the first light emission unit 103 and the second light emission unit 104 because the first light emission unit 103 and the second light emission unit 104 independently emit the light at the different timings, so that the peak of the power consumption waveform illustrated in FIG. 6 can become smaller than the peak of power consumption waveform illustrated in FIG. 5.

In this case, the battery 22 can supply sufficient power, and the light quantity of the irradiation light emitted from the first light emission unit 103 and the light quantity of the irradiation light emitted from the second light emission unit 104 become given sufficient levels, and the measurable distance can be set longer, so that the angle of view can be widened by a combination of the plurality of light emission units (first light emission unit 103 and second light emission unit 104) and the light reception unit (first light reception unit 101 and the second light reception unit 102).

Further, when the timing of the irradiation (light emission) by the first light emission unit 103 is different from the timing of the irradiation (light emission) by the second light emission unit 104, each of the first light reception unit 101 and the second light reception unit 102 can correctly determine whether the reflection light corresponds to the irradiation light emitted from the first light emission unit 103 or the irradiation light emitted from the second light emission unit 104, so that the range finding can be performed accurately, and thereby the range finding precision can be enhanced.

Modification Example 1

Figure 8:
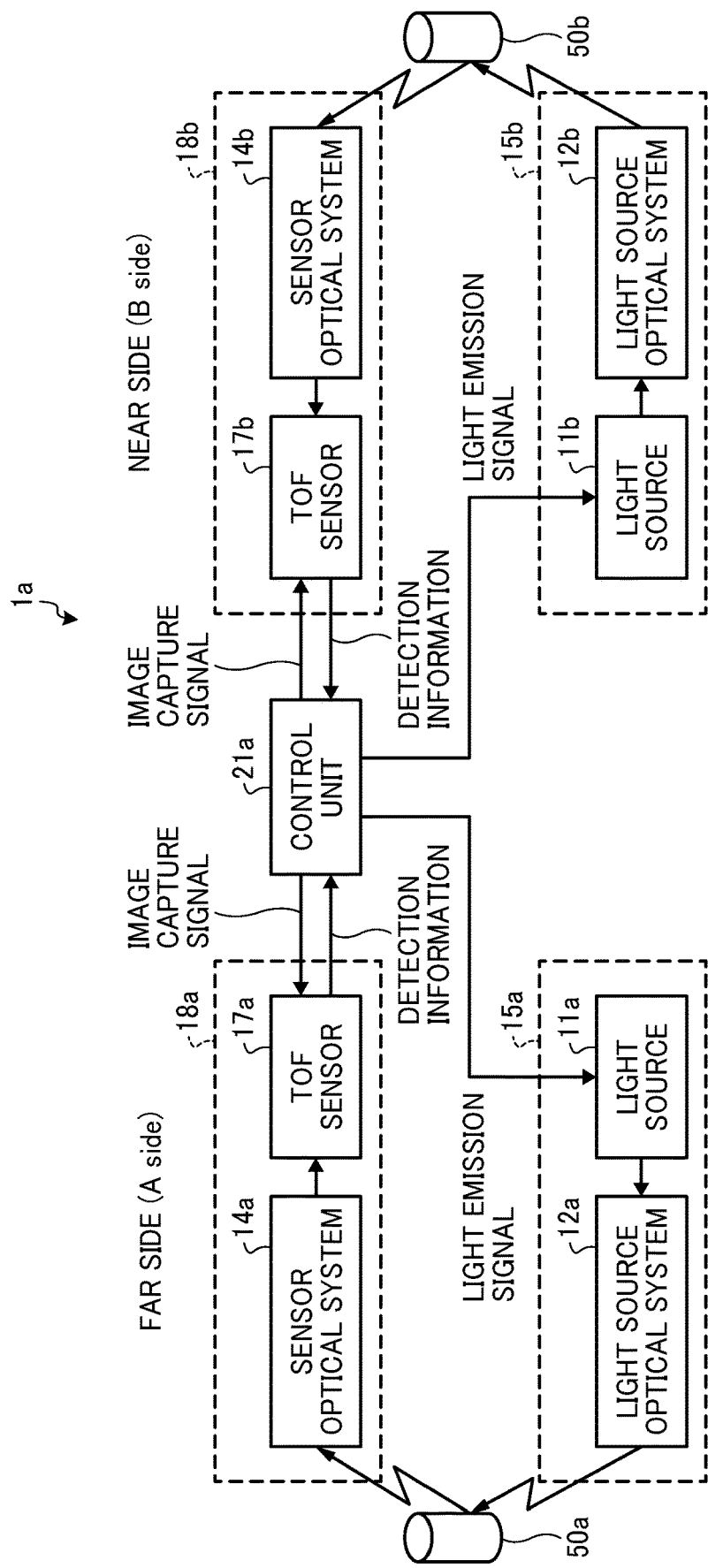
FIG. 8 illustrates an example of a hardware block diagram of a range finding device according to modification example 1 of an embodiment of this disclosure.

FIG. 8 illustrates an example of a hardware block diagram of a range finding device 1a according to modification example 1 of the embodiment. Hereinafter, a description is given of a hardware configuration of the range finding device 1a with reference FIG. 8.

As illustrated in FIG. 8, the range finding device 1a includes, for example, a light emission unit 15a including a light source 11a and a light source optical system 12a, a light emission unit 15b including a light source 11b and a light source optical system 12b, a light reception unit 18a including a TOF sensor 17a and a sensor optical system 14a, a light reception unit 18b including a TOF sensor 17b and a sensor optical system 14b, and a control unit 21a.

In the same manner as the above described control unit 21, the control unit 21a transmits the image capture signals (operating signals) respectively to the TOF sensors 17a and 17b by shifting the timings. Further, the control unit 21a transmits the light emission signals (light emission patterns) to the light sources 11a and 11b in synchronization with the image capture signals for the TOF sensors 17a and 17b. Then, the light sources 11a and 11b emit the light in accordance with the light emission signals received from the control unit 21a, and then emit the light as the irradiation light through the light source optical systems 12a and 12b, respectively.

In an example case of FIG. 8, the irradiation light emitted from the light source optical system 12a is reflected by the object 50a disposed at the A side (far side), and then received by the TOF sensor 17a via the sensor optical system 14a. Further, the irradiation light emitted from the light source optical system 12b is reflected by the object 50b disposed at the B side (near side), and then received by the TOF sensor 17b via the sensor optical system 14b.

When each of the TOF sensor 17a and 17b receives the reflection light, each of the TOF sensor 17a and 17b outputs the detection information including information about the time difference between the time of emitting the irradiation light and the time of receiving the reflection light detected by each sensor element, to the control unit 21a.

Then, based on the detection information received from the TOF sensors 17a and 17b, the control unit 21a calculates a distance image by converting the time information into a distance value for each pixel.

As described above, as to the range finding device 1a according to the modification example 1, the TOF sensor does not transmit the light emission signal to the light source, but the control unit 21a transmits the light emission signal to the light sources 11a and 11b. This configuration can also provide the same effect as the range finding device 1 according to the above described embodiment.

Modification Example 2

Figure 9:
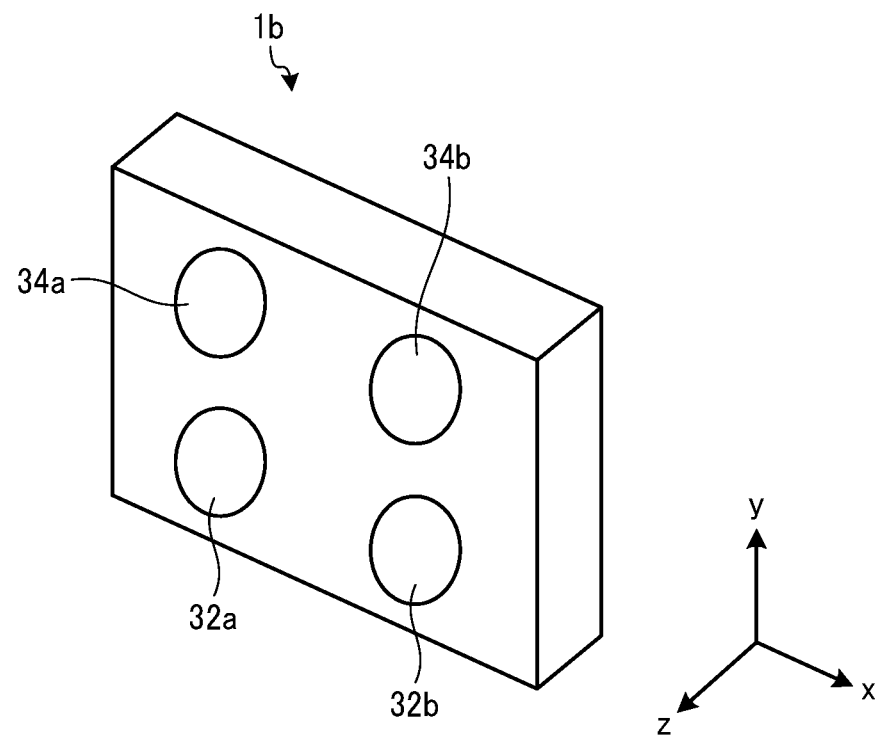
FIG. 9 illustrates an exterior view of a range finding device according to modification example 2 of an embodiment of this disclosure.

FIG. 9 is an external view of a range finding device 1b according to modification example 2 of the embodiment. Hereinafter, a description is given of an external configuration of the range finding device 1b with reference FIG. 9.

Instead of the light source optical systems 12a and 12b and the sensor optical systems 14a and 14b of the range finding device 1a described above, as illustrated in FIG. 9, the range finding device 1b includes, for example, light source optical systems 32a and 32b, and sensor optical systems 34a and 34b.

As illustrated in FIG. 9, the light source optical systems 32a and 32b and the sensor optical systems 34a and 34b are disposed on the same face of a housing of the range finding device 1b. That is, the optical axis of the light source optical system 32a and the optical axis of the light source optical system 32b are set parallel each other, and the irradiation light emitted from the light source optical system 32a and the irradiation light emitted from the light source optical system 32b are projected in the same direction. Further, the optical axis of the sensor optical system 34a and the optical axis of the sensor optical system 34b are set parallel to each other. The operation of the range finding device 1b is the same as that of the range finding device 1 according to the above-described embodiment.

Figure 10:
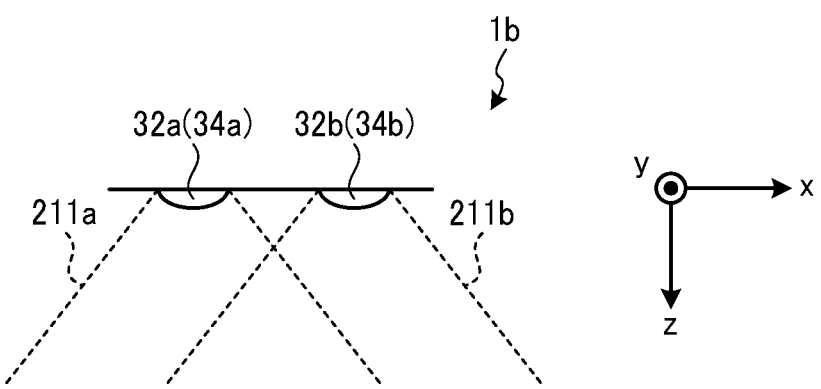
FIG. 10 illustrates an angle of view of a range finding device according to modification example 2 of an embodiment of this disclosure.

FIG. 10 illustrates an angle of view of the range finding device 1b according to the modification example 2. Hereinafter, a description is given of the angle of view of the range finding device 1b with reference FIG. 10.

As illustrated in FIG. 10, the irradiation light emitted from the light source optical system 32a has an angle of view 211a, and the irradiation light emitted by the light source optical system 32b has an angle of view 211b. Therefore, as illustrated in FIG. 10, the angle of view of the irradiation light emitted from the light source optical system 32a and the angle of view of the irradiation light emitted from the light source optical system 32b overlap in a wider range.

However, similar to the above described range finding device 1, as to the range finding device 1b, the timing of the irradiation from the light source optical system 32a and the timing of the irradiation from the light source optical system 32b are shifted so as not overlap with each other.

Thus, the peak of power consumption waveform becomes different in each of the light source optical system 32a and the light source optical system 32b because the light source optical system 32a and the light source optical system 32b independently emit the light at the different timings, so that the peak of the power consumption can become smaller compared to a case where the timing of the irradiation is set to the same timing.

In this case, the battery 22 can supply sufficient power, and the light quantity of the irradiation light emitted from the light source of the light source optical system 32a and the light quantity of the irradiation light emitted from the light source of the light source optical system 32b become given sufficient levels, and the measurable distance can be set longer, so that the angle of view can be widened in a direction parallel to the face of the housing arranging the light source optical systems 32a and 32b as illustrated in FIG. 10.

Further, when the timing of the irradiation (light emission) from the light source optical system 32a and the timing of the irradiation (light emission) from the light source optical system 32b are shifted, each of the TOF sensor 17a (corresponding to the TOF sensor 13a) corresponding to the sensor optical system 34a and the TOF sensor 17b (corresponding to the TOF sensor 13b) corresponding to the sensor optical system 34b can correctly determine whether the reflection light corresponds to the irradiation light emitted from the light source optical system 32a or the light source optical system 32b, so that the range finding can be performed accurately, and thereby the range finding precision can be enhanced.

FIG. 9 illustrates one example configuration having two sets of the light source and the TOF sensor. For example, three or more sets of the light source and the TOF sensor can be used.

FIG. 9 illustrates one example configuration disposing the light source optical systems 32a and 32b and the sensor optical systems 34a and 34b are on the same face of the housing of the range finding device 1b, but is not limited thereto. For example, a face of the housing disposing the light source optical system 32a and the sensor optical system 34a and a face of the housing disposing the light source optical system 32b and the sensor optical system 34b can be different faces.

Modification Example 3

Hereinafter, a description is given of a range finding device 1c according to modification example 3 with reference to differences compared to the range finding device 1 according to the above-described embodiment. The above-described range finding device 1 employs one configuration including two sets of the light source and the TOF sensor. As to the modification example 3, the range finding device 1c employs a configuration including four sets of the light source and the TOF sensor.

(Configuration and Angle of View of Range Finding Device)

Figure 11:
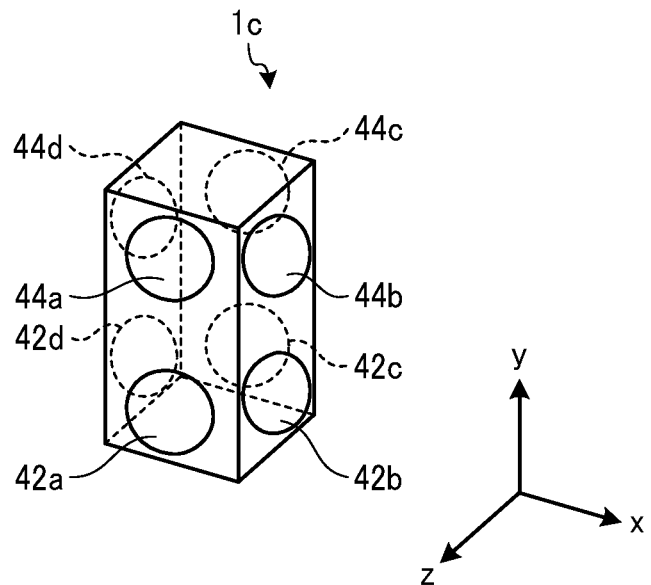
FIG. 11 illustrates an exterior view of a range finding device according to modification example 3 of an embodiment of this disclosure.
Figure 12:
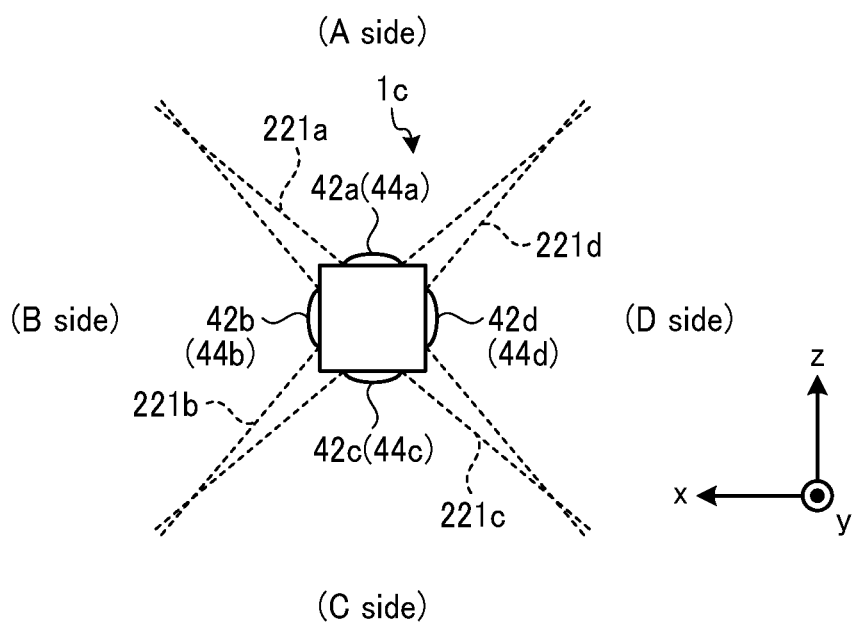
FIG. 12 illustrates an angle of view of the range finding device according to modification example 3 of an embodiment of this disclosure.

FIG. 11 is an external view of the range finding device 1c according to a modification example 3. FIG. 12 illustrates an angle of view of the range finding device 1c according to the modification example 3. Hereinafter, a description is given of the configuration and the angle of view of the range finding device 1c with reference to FIGS. 11 and 12.

As illustrated in FIG. 11, the range finding device 1c includes, for example, light source optical systems 42a to 42d, and sensor optical systems 44a to 44d. Further, the range finding device 1c includes the light source corresponding each of the light source optical systems 42a to 42d, and includes the TOF sensor corresponding to each of the sensor optical systems 44a to 44d. Further, the range finding device 1c includes the control unit 21 and the battery 22, which are included in the range finding device 1 according to the above-described embodiment.

As illustrated in FIG. 11, the range finding device 1c includes the light source optical system 42a and the sensor optical system 44a on a first side face, the light source optical system 42b and the sensor optical system 44b on a second side face, the light source optical system 42c and the sensor optical system 44c on a third side face, and the light source optical system 42d and the sensor optical system 44d on a fourth side face, in which each of the side faces configure the rectangular parallelepiped housing of the range finding device 1c.

Further, as illustrated in FIG. 12, the irradiation light emitted from the light source optical system 42a to the A side has an angle of view 221a of 90 degrees or more, the irradiation light emitted from the light source optical system 42b toward the B side has an angle of view 221b of 90 degrees or more, the irradiation light emitted from the light source optical system 42c toward the C side has an angle of view 221c of 90 degrees or more, and the irradiation light emitted from the light source optical system 42c has an angle of view 221d of 90 degrees or more. Since the angle of views 221a to 221d of the irradiation light emitted respectively from the light source optical systems 42a to 42d is 90 degrees or more, the angle of views overlap partially with each other as illustrated in FIG. 12.

Since each of the sensor optical systems 44a to 44d uses the respective TOF sensor to receive the respective reflection light with respect to the respective irradiation light emitted with the angle of views 221a to 221d, the respective reflection light is focused on the respective TOF sensor with the same angle of view of the irradiation light emitted from the respective light source optical systems 42a to 42d.

(Functional Configuration of Range Finding Device)

Figure 13:
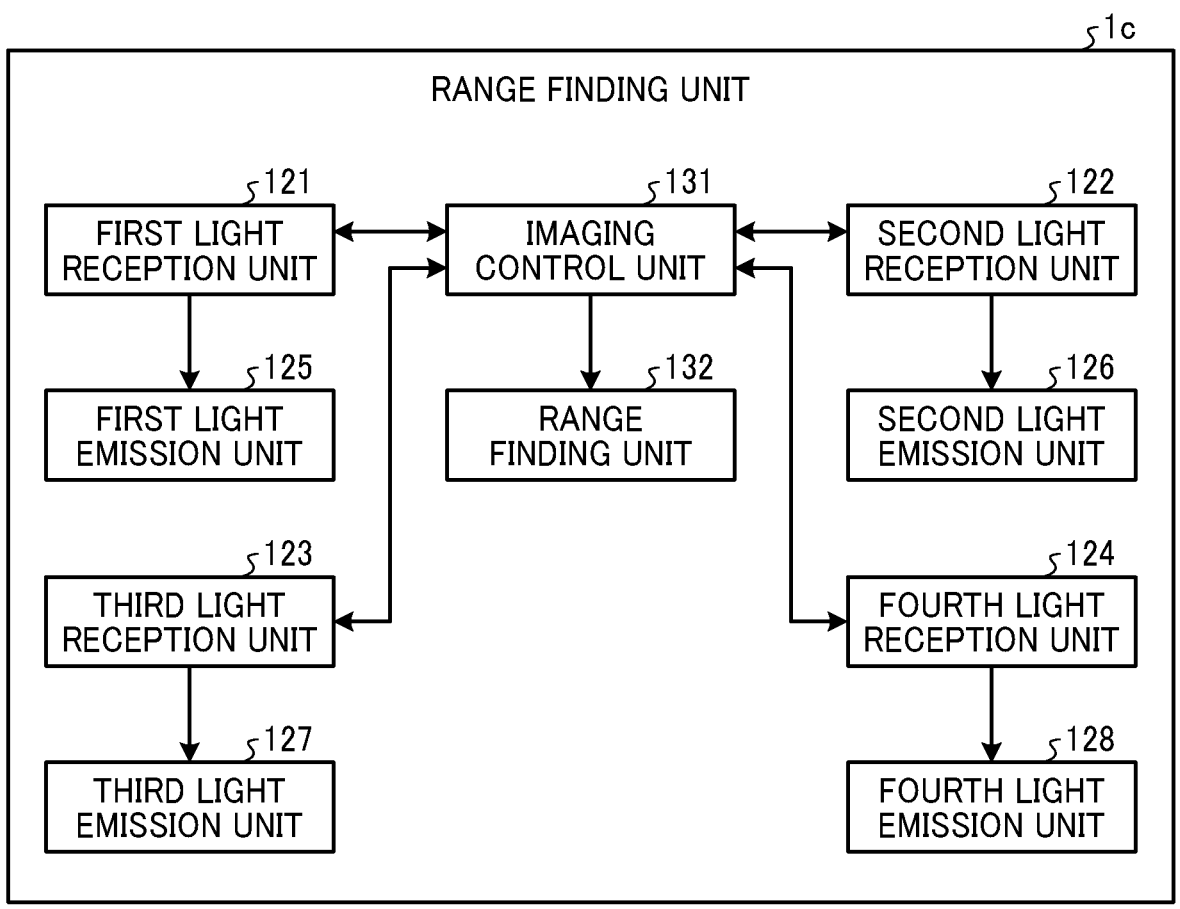
FIG. 13 illustrates an example of a functional block diagram of a range finding device according to modification example 3 of an embodiment of this disclosure.

FIG. 13 illustrates an example of a functional block diagram of the range finding device 1c according to the modification example 3. Hereinafter, a description is given of a functional block diagram of the range finding device 1c with reference to FIG. 13.

As illustrated in FIG. 13, the range finding device 1c includes, for example, a first light reception unit 121 (light reception unit), a second light reception unit 122 (light reception unit), a third light reception unit 123 (light reception unit), a fourth light reception unit 124 (light reception unit), a first light emission unit 125, a second light emission unit 126, a third light emission unit 127, a fourth light emission unit 128, an imaging control unit 131 (operation control unit), and a range finding unit 132 (measurement unit).

The first light reception unit 121 is a functional unit that receives the reflection light, which is the light reflected from an object when the irradiation light emitted from the first light emission unit 125 hits and reflects from the object, in accordance with the image capture signal received from the imaging control unit 131.

Further, when the first light reception unit 121 receives the image capture signal from the imaging control unit 131, the first light reception unit 121 outputs the light emission signal to the first light emission unit 125 to control the light emitting operation.

Further, when the first light reception unit 121 receives the reflection light, the first light reception unit 121 outputs detection information including information about the time difference between the time of emitting the irradiation light and the time of receiving the reflection light.

The first light reception unit 121 can be implemented by the sensor optical system 44a illustrated in FIG. 11 and the corresponding TOF sensor.

The second light reception unit 122 is a functional unit that receives the reflection light, which is the light reflected from an object when the irradiation light emitted from the second light emission unit 126 hits and reflects from the object, in accordance with the image capture signal received from the imaging control unit 131.

Further, when the second light reception unit 122 receives the image capture signal from the imaging control unit 131, the second light reception unit 122 outputs the light emission signal to the second light emission unit 126 to control the light emitting operation.

Further, when the second light reception unit 122 receives the reflection light, the second light reception unit 122 outputs detection information including information about the time difference between the time of emitting the irradiation light and the time of receiving the reflection light.

The second light reception unit 122 can be implemented by the sensor optical system 44b illustrated in FIG. 11 and the corresponding TOF sensor.

The third light reception unit 123 is a functional unit that receives the reflection light, which is the light reflected from an object when the irradiation light emitted from the third light emission unit 127 hits and reflects from the object, in accordance with the image capture signal received from the imaging control unit 131.

Further, when the third light reception unit 123 receives the image capture signal from the imaging control unit 131, the third light reception unit 123 outputs the light emission signal to the third light emission unit 127 to control the light emitting operation.

Further, when the third light reception unit 123 receives the reflection light, the third light reception unit 123 outputs detection information including information about the time difference between the time of emitting the irradiation light and the time of receiving the reflection light.

The third light reception unit 123 can be implemented by the sensor optical system 44c illustrated in FIG. 11 and the corresponding TOF sensor.

The fourth light reception unit 124 is a functional unit that receives the reflection light, which is the light reflected from an object when the irradiation light emitted from the fourth light emission unit 128 hits and reflects from the object, in accordance with the image capture signal received from the imaging control unit 131.

Further, when the fourth light reception unit 124 receives the image capture signal from the imaging control unit 131, the fourth light reception unit 124 outputs the light emission signal to the fourth light emission unit 128 to control the light emitting operation.

Further, when the fourth light reception unit 124 receives the reflection light, the fourth light reception unit 124 outputs detection information including information about the time difference between the time of emitting the irradiation light and the time of receiving the reflection light.

The fourth light reception unit 124 can be implemented by the sensor optical system 44d illustrated in FIG. 11 and the corresponding TOF sensor.

The first light emission unit 125 is a functional unit that projects the irradiation light emitted from the corresponding light source to the outside in accordance with the light emission signal received from the first light reception unit 121. The first light emission unit 125 can be implemented by the light source optical system 42a illustrated in FIG. 11 and the corresponding light source.

The second light emission unit 126 is a functional unit that projects the irradiation light emitted from the corresponding light source to the outside in accordance with the light emission signal received from the second light reception unit 122. The second light emission unit 126 can be implemented by the light source optical system 42b illustrated in FIG. 11 and the corresponding light source.

The third light emission unit 127 is a functional unit that projects the irradiation light emitted from the corresponding light source to the outside in accordance with the light emission signal received from the third light reception unit 123. The third light emission unit 127 can be implemented by the light source optical system 42c illustrated in FIG. 11 and the corresponding light source.

The fourth light emission unit 128 is a functional unit that projects the irradiation light emitted from the corresponding light source to the outside in accordance with the light emission signal received from the fourth light reception unit 124. The fourth light emission unit 128 can be implemented by the light source optical system 42d illustrated in FIG. 11 and the corresponding light source.

The imaging control unit 131 is a functional unit that controls the operations of the first light reception unit 121, the second light reception unit 122, the third light reception unit 123 and the fourth light reception unit 124.

Specifically, the imaging control unit 131 transmits the image capture signals (operation signals) respectively to the first light reception unit 121, the second light reception unit 122, the third light reception unit 123 and the fourth light reception unit 124 while shifting the transmission timing of the image capture signals to control the imaging operations performed by the first light reception unit 121, the second light reception unit 122, the third light reception unit 123 and the fourth light reception unit 124 (i.e., light receiving operation, light emitting operations of the first light emission unit 125, second light emission unit 126, third light emission unit 127, and fourth light emission unit 128) by shifting each of the imaging operations.

Further, the imaging control unit 131 receives the detection information from the first light reception unit 121, the second light reception unit 122, the third light reception unit 123, and the fourth light reception unit 124.

The imaging control unit 131 can be implemented by a control circuit corresponding to the control unit 21 illustrated in FIG. 3.

The range finding unit 132 is a functional unit that generates a distance image by converting the time information into a distance value for each pixel based on the detection information that the imaging control unit 131 has received from the first light reception unit 121, the second light reception unit 122, the third light reception unit 123, and the fourth light reception unit 124. The range finding unit 132 can be implemented by control circuit corresponding to the control unit 21 illustrated in FIG. 3.

Further, the first light reception unit 121, the second light reception unit 122, the third light reception unit 123, the fourth light reception unit 124, the first light emission unit 125, the second light emission unit 126, the third light emission unit 127, the fourth light emission unit 128, the imaging control unit 131 and the range finding unit 132 of the range finding device 1c are conceptually illustrated in FIG. 13, and the functional units are not limited thereto. That is, a plurality of functional units illustrated as separate functional units in the range finding device 1c of FIG. 13 can be implemented as one functional unit. On the other hand, the function of one functional unit in the range finding device 1c of FIG. 13 can be divided into a plurality of functions, and a plurality of functional units can be configured.

Further, the first light reception unit 121, the second light reception unit 122, the third light reception unit 123, and the fourth light reception unit 124 output the detection information including the information about the time difference between the time of emitting the irradiation light and the time of receiving the reflection light, but is not limited thereto. That is, the first light reception unit 121, the second light reception unit 122, the third light reception unit 123, and the fourth light reception unit 124 can be configured to calculate the distance based on information of the time difference between the time of emitting the irradiation light and the time of receiving the reflection light, and directly output the distance information as the detection information.

(Light Emission Timing of Light Emission Unit and Light Reception Timing of Light Reception Unit)

FIG. 14 illustrates an example of a timing chart of light emission timing when the light emission timings of all of the light sources included in the range finding device 1c are shifted.

FIG. 15 illustrates an example of a timing chart of light emission timings when the light emission timing of some of a plurality of light sources included in the range finding device 1c are set to the same timing.

Hereinafter, a description is given of an operation in a case when the light emission timings of the four light emission units (first light emission unit 125, second light emission unit 126, third light emission unit 127, fourth light emission unit 128) are shifted with reference to FIG. 14.

As illustrated in FIG. 14, as to the range finding device 1c, for example, the light-emission timing of the light emitted by the first light emission unit 125 (A side light-emission timing), the light-emission timing of the light emitted by the second light emission unit 126 (B side emitting timing), the light-emission timing of the light emitted by the third light emission unit 127 (C side light emission timing), and the light-emission timing of the light emitted by the fourth light emission unit 128 (D side light emission timing) are shifted so as not to overlap with each other.

Thus, the peak of power consumption waveform becomes different in each of the first light emission unit 125, the second light emission unit 126, the third light emission unit 127 and the fourth light emission unit 128 because the first light emission unit 125, the second light emission unit 126, the third light emission unit 127 and the fourth light emission unit 128 independently emit the light at the different timings, so that the peak of the power consumption waveform can become smaller.

In this case, the battery 22 can supply sufficient power even if the battery 22 is a mobile battery, and the light quantity of the irradiation light emitted from the first light emission unit 125, the second light emission unit 126, the third light emission unit 127 and the fourth light emission unit 128 become given sufficient levels, and the measurable distance can be set longer.

Further, if the A side light emission timing, the B side light emission timing, the C side emitting timing and the D side light emission timing are shifted, the first light reception unit 121, the second light reception unit 122, the third light reception unit 123 and the fourth light reception unit 124 can correctly determine whether the reflection light corresponds to which irradiation light emitted from the first light emission unit 125, the second light emission unit 126, the third light emission unit 127, or the fourth light emission unit 128, so that the range finding can be performed accurately, and thereby the range finding precision can be enhanced.

Further, the shifting of each light emission timing is not limited to one example case illustrated in FIG. 14. For example, if at least any two light emission timing does not overlap with each other, the shifting of each light emission timing can be satisfied.

In an example case illustrated in FIG. 14, all of the light emission timings are shifted, but is not limited thereto. For example, as illustrated in FIG. 15, the light emission timing on the A side and the light emission timing on the C side, which do not have an overlapping of the angle of views as illustrated in FIG. 11 can be set to the same timing, and the light emission timing on the B side and the light emission timing on the D side, which do not have an overlapping of the angle of views as illustrated in FIG. 11 can be set to the same timing.

In this configuration, since the angle of views of the irradiation light emitted from the different light sources at the same timing do not overlap with each other, the first light reception unit 121, the second light reception unit 122, the third light reception unit 123 and the fourth light reception unit 124 correctly determine whether the reflection light corresponds to which irradiation light emitted from the first light emission unit 125, the second light emission unit 126, the third light emission unit 127, or the fourth light emission unit 128, so that the range finding can be performed accurately, and thereby the range finding precision can be enhanced.

In the configuration of shifting some of the light emission timings (see FIG. 15), although the peak of power consumption may become greater compared to the configuration of shifting all of the light emission timings (see FIG. 14), the time period required for the imaging operation can be shortened.

Further, in the configuration of shifting some of the light emission timings (see FIG. 15), the peak of power consumption can be reduced compared to the configuration setting all of the light emission timings at the same timing.

In the modification example 3, the configuration using four sets of the light source and the TOF sensor is described, but is not limited thereto. For example, if a configuration using five or more sets of the light source and the TOF sensor is provided, and the light sources having angle of views not overlapping with each other emit the light at the same timing, the above described effects can be obtained.

As to the above described embodiment and modification examples, the range finding device and the range finding method can reduce an increase in the peak power consumption even if a plurality of light sources used, and can improve the accuracy of range finding.

The respective functions (e.g., imaging control unit 111, range finding unit 112) of the above-described embodiment and the modification examples can be implemented by one or more processing circuits. The processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Further, in the above-described embodiment and the modification examples, if at least one of the functional units of the range finding devices 1, la, 1b, and 1c is implemented executing one or more programs, the programs can provided by installing the programs on the ROM or the like in advance.

Further, in the above-described embodiment and the modification examples, the programs executed by the range finding devices 1, la, 1b, and 1c may be recorded and provided on a computer-readable recording medium, such as compact disk read only memory (CD-ROM), flexible disk (FD), compact disk-recordable (CD-R), and digital versatile disc (DVD).

Further, in the above-described embodiment and the modification examples, the programs executed by the range finding devices 1, la, 1b, and 1c can be provided by storing the programs in a computer connected to a network such as the Internet, and downloading the programs via the network.

Further, in the above-described embodiment and the modification examples, the programs executed by the range finding devices 1, la, 1b, and 1c can be provided or distributed via a network such as the Internet.

Further, in the above-described embodiment and the modification examples, the programs executed by the range finding devices 1, la, 1b, and 1c can be created using modules including at least any of the above-described functional units, and in the actual hardware, the CPU reads the programs from the storage device and executes the programs to load the above-described functional units on a main storage device.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

Each of the embodiments described above is presented as an example, and it is not intended to limit the scope of the present disclosure. Numerous additional modifications and variations are possible in light of the above teachings. It is therefore to be understood that, within the scope of the appended claims, the disclosure of this specification can be practiced otherwise than as specifically described herein. Any one of the above-described operations may be performed in various other ways, for example, in an order different from the one described above.

What is claimed is:

1. An irradiation device comprising:
a plurality of light sources in a housing, each configured to emit irradiation light outwardly from the housing to an object;
a plurality of light receivers configured to receive reflection light coming from the object when the irradiation light hits and reflects from the object, the light receivers facing in different directions so as to acquire a full-view spherical range; and
circuitry configured to control light emission of the plurality of light sources,
wherein the plurality of light sources include:
a first light source group including one or more light sources to emit light at a first timing; and
a second light source group including one or more light sources to emit light at a second timing different from the first timing.

2. The irradiation device according to claim 1,
wherein the plurality of light sources further includes a third light source group including one or more light sources to emit light at the first timing.

3. The irradiation device according to claim 2,
wherein an angle of view of the light emitted from the first light source group does not overlap with an angle of view of the light emitted from the third light source group.

4. The irradiation device according to claim 1,
wherein the circuitry transmits an operation signal to each of the light receivers, and
wherein a light emission signal is output to each of the light sources based on the operation signal from each of the light receivers or based on a timing of the operation signal.

5. The irradiation device according to claim 1,
wherein the first light source group and the second light source group emit the light in a same direction.

6. The irradiation device according to claim 1,
wherein each of the light receivers is a time of flight (TOF) sensor.

7. The irradiation device according to claim 1, wherein:
each of the light receivers includes sensor elements arranged two dimensionally, and the circuitry calculates a distance image based on information output from each of the light receivers.

8. A method of finding a range to an object comprising:
emitting, at a first timing, light from a first light source group within a housing, the first light source group including one or more light sources which emit the light at the first timing;

emitting, at a second timing different from the first timing, light from a second light source group within the housing, the second light source group including one or more light sources which emit the light at the second timing;

receiving, using a plurality of light receivers, reflection light coming from the object when the light from the first light source group and light from the second light source group hits and reflects from the object, the light receivers facing in different directions so as to acquire a full-view spherical range; and calculating a distance to the object based on information output from each of the plurality of light receivers.

9. The irradiation device according to claim 2,
wherein an angle of view of the light emitted from the first light source group overlaps with an angle of view of the light emitted from the second light source group.

10. The irradiation device according to claim 1,
wherein the circuitry starts light emission of the second light source group after stopping light emission of the first light source group.

11. The irradiation device according to claim 1,
wherein the circuitry starts light emission of the second light source group after stopping light emission of the first light source group ends, and then restarts light emission of the first light source group after stopping the light emission of the second light source group.

12. The irradiation device according to claim 1,
wherein the circuitry calculates a distance to the object based on information output from each of the plurality of light receivers.

13. An irradiation device comprising:
a projector including a plurality of light source optical systems within a housing, each configured to project irradiation light outwardly from the housing to an object;
a plurality of light receivers configured to receive reflection light coming from the object when the irradiation light hits and reflects from the object, the light receivers facing in different directions so as to acquire a full-view spherical range; and
circuitry configured to control light projection of the plurality of light source optical systems,
wherein the plurality of light source optical systems include:
a first light source optical system to project the irradiation light at a first timing; and
a second light source optical system to project the irradiation light at a second timing different from the first timing.

14. The irradiation device according to claim 13,
wherein an angle of view of the irradiation light emitted from the first light source optical system overlaps with an angle of view of the irradiation light emitted from the second light source optical system.

15. The irradiation device according to claim 13,
wherein the circuitry stops light projection of the first light source optical system before starting light projection of the second light source optical system.

16. The irradiation device according to claim 13,
wherein the plurality of light source optical systems include a plurality of light sources, respectively.

17. The irradiation device according to claim 1, wherein:
the first light source group emits the light in a first direction, and
the second light source group emits the light in a second direction different from the first direction.

18. The irradiation device according to claim 1, wherein:
the first light source group and the second light source group are powered from a same power source.

19. An image capturing device, comprising:
a plurality of light sources in a housing, each to emit irradiation light;
a plurality of light receivers to receive the irradiation light reflected from an object and capture images with the irradiation light which is received, the light receivers facing in different directions so as to acquire a full-view spherical range; and
circuitry configured to control timings of emission of the plurality of light sources,
wherein the plurality of light sources includes:
a first light source group including one or more light sources to emit light at a first timing; and
a second light source group including one or more light sources to emit light at a second timing different from the first timing.

20. The image capturing device, according to claim 19, wherein:
the plurality of light sources further includes a third light source group including one or more light sources to emit light at the first timing, and
an angle of view of the light emitted from the first light source group overlaps with an angle of view of the light emitted from the second light source group.

\* \* \* \* \*